United States Patent [19]

Blahut

[11] Patent Number: 5,373,288
[45] Date of Patent: Dec. 13, 1994

[54] INITIALIZING TERMINALS IN A SIGNAL DISTRIBUTION SYSTEM
[75] Inventor: Donald E. Blahut, Holmdel, N.J.
[73] Assignee: AT&T Corp., Murray Hill, N.J.
[21] Appl. No.: 965,463
[22] Filed: Oct. 23, 1992
[51] Int. Cl.$^5$ .................. H04N 7/16; G06F 13/22
[52] U.S. Cl. .................. 340/825.08; 340/825.52; 370/85.8; 370/95.2
[58] Field of Search .............. 340/825.08, 825.52; 370/85.7, 85.8, 95.1, 95.2; 358/86

[56] References Cited
U.S. PATENT DOCUMENTS

| Re. 31,735 | 11/1984 | Davidson. | |
|---|---|---|---|
| 4,689,619 | 8/1987 | O'Brien, Jr. | 340/825.08 |
| 4,689,786 | 8/1987 | Sidhu et al. | 340/825.52 |
| 4,727,475 | 2/1988 | Kiremidjian | 340/825.52 |
| 5,157,658 | 10/1992 | Arai et al. | 340/825.08 |

Primary Examiner—Michael Horabik
Attorney, Agent, or Firm—Geoffrey D. Green; David M. Rosenblatt

[57] ABSTRACT

Signal distribution systems, such as interactive cable television systems, have a central server that communicates with remote terminals wherein the server assigns a specific address to each newly-connected terminal for control messages and polls. In the case of an interactive cable television system, such terminal is the set-top box or converter connected between the cable system and the television receiver. Periodically, the server broadcasts a control message containing a tentative address, and polls the tentative address. Upon receiving such a message, a newly-connected converter stores the tentative address and responds to the poll with an uplink message. After receiving the uplink message, the server inserts the tentative address in its polling list in accordance with the transmission delay measured from sending the poll to receiving the uplink message and selects a new tentative address to use in subsequent broadcast control messages. Uplink messages are echoed by the server and verified by the converter. If the converter cannot verify an echoed uplink message, which can occur if more than one newly-connected converter responds to the same broadcast control message, the converter repeats its initialization procedure to acquire a new address. After the initialization is complete, system software can be downloaded from the server to the converter and the converter placed in service.

9 Claims, 3 Drawing Sheets

INITIALIZING TERMINALS IN A SIGNAL DISTRIBUTION SYSTEM

TECHNICAL FIELD

This invention relates to signal distribution systems, such as interactive cable television systems, and more particularly to methods and apparatus by which a terminal connected to such a system can be initialized remotely to assign a specific address for control messages and polls and to download computer programs.

BACKGROUND OF THE INVENTION

Cable television systems have made possible the transmission of many channels of television programs to the homes of subscribers. Instead of being limited to the number of VHF and UHF channels that can be transmitted and received in a given area, the number of channels in cable systems is limited only by the transmission characteristics of the cable itself and the ability to compress the information in television programs into narrower-bandwidth channels. The advent of fiber-optic transmission systems for use in cable television networks has also vastly increased the number of channels available.

Such increase in channels has also given rise to proposals for interactive television systems wherein a subscriber can transmit information or requests back into the system, which information or requests may subsequently affect programs or information directed to such subscriber. There are a wide variety of applications for interactive television systems, such as video games, video catalog shopping, teaching systems, movies on demand and audio programs. Each application can be tailored for an individual subscriber, for example, a subscriber may be able to select the language of the soundtrack in a movie. However, such systems typically require the ability (i) to control specific programs or information sent to each subscriber and (ii) to receive input messages or requests from the subscriber.

In many cable television systems, a special converter is used at the subscriber location to allow the subscriber to select among the various available channels, and possibly to "unscramble" premium channels for which extra tees are payable. Such converters usually provide an output on one of the channels that a standard television receiver can receive, such as Channel 3. More recently, television receivers and video recorders have been made available that are "cable ready," that is, with the ability to receive and select among all the channels transmitted over the cable system, but without the ability to unscramble premium channels. A converter is still needed for the premium channels.

In order to implement many of the features of interactive television systems, it is necessary for messages containing information or requests from subscribers to be transmitted to a central control location. It is desirable for these "uplink" messages to be transmitted from subscribers over the same facility used to distribute programs. Conventional cable systems use frequencies above 50 MHz, allocated in 6 MHz distribution channels, for programs and frequencies in the 5-30 MHz band for such uplink messages. However, because many subscribers will be sending messages over the same uplink frequencies, some means is needed to coordinate such messages to prevent interference and to identify the source of each message.

When a subscriber is first connected to a cable television system with converters at subscriber locations, it is typically necessary for a service technician to install and initialize a converter for such subscriber in the field. Also, a visit by a technician may be needed to re-initialize a converter after a service interruption or a power failure. Such visits can be costly. Accordingly, it is desirable to provide a converter that can be initialized remotely over the cable system so that such a converter can be furnished to a subscriber for self-installation and for remote initialization or re-initialization.

SUMMARY OF THE INVENTION

One or more channels in a multi-channel cable television distribution system are used for the transmission of interactive television (ITV) signals in the form of packetized digital information from a server at the cable system headend to converters at subscriber locations. Each converter contains a receiver for ITV signals and is connected between the cable system and the subscriber's television receiver. Packets in the ITV signals are identified as belonging to virtual channels. At least one virtual channel is used for control messages, which are read by each converter, and converters are enabled by control messages to receive one or more additional virtual channels in one of the ITV channels. Each packet transmitted also includes a polling address that causes an uplink message to be transmitted back into the cable system by the polled converter. The polling addresses are polled in an order determined by the distance from the cable- system head end to subscribers, as measured by transmission delay, so that the nearest subscriber is polled first.

The specific address of a converter is set remotely during an initialization sequence that occurs, for example, when the converter is first installed or when power is restored after an outage. Periodically, the server at the cable head end broadcasts a control message containing a tentative address and then polls that address, followed by at least one poll to a null address. On receipt of such a control message, a newly-connected converter stores the tentative address as its specific address and responds to such poll with an uplink message. On receipt of the uplink message, the server inserts the tentative address in its polling list in accordance with the transmission delay measured from sending the poll to receiving the uplink message and selects a new tentative address to use in subsequent broadcast control messages. Uplink messages from the converter are echoed by the server and verified by the converter. If the converter cannot verify an echoed uplink message, which can occur if more than one newly-connected converter responds to the same broadcast control message, the converter restarts its initialization sequence after receiving a randomly-chosen number of broadcast control messages, thus increasing the likelihood that only one converter will respond to the same broadcast control message. The initialization software is loaded in ROM in the converter. After a successful initialization, system software can be downloaded from the server into RAM in the converter and the converter is placed in service.

These and other aspects of the invention will become apparent from the attached drawings and detailed description.

DETAILED DESCRIPTION

The invention will be described in the context of an interactive cable television system in which a central server at the cable headend communicates with converters at subscriber locations. However, it will be clear to those skilled in the art that the invention can be used in other signal distribution systems in which a central server communicates with remote terminals.

Figure 1:
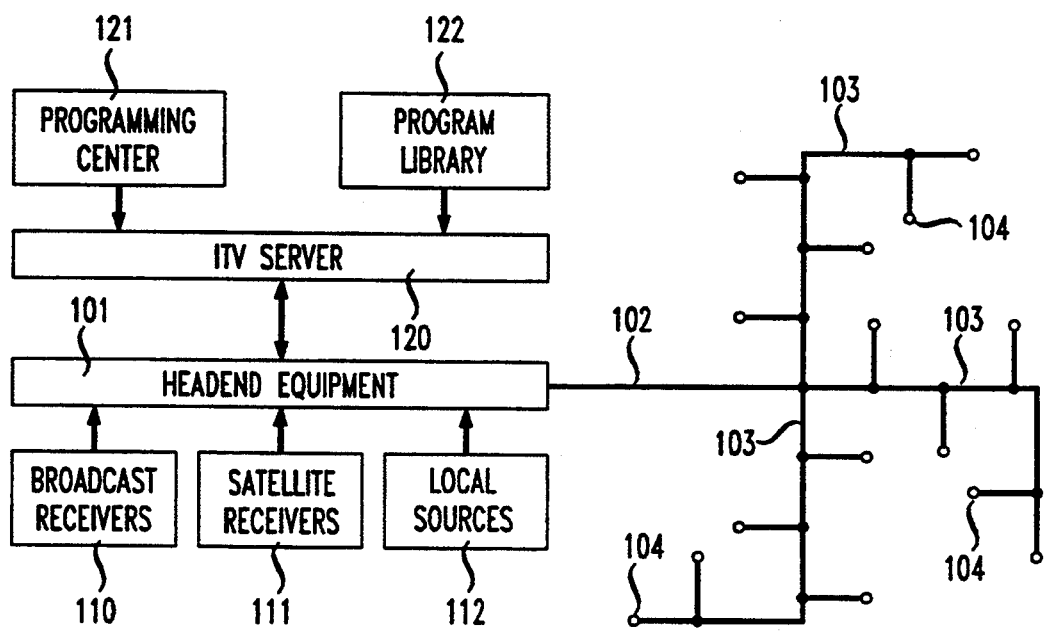
FIG. 1 is a schematic block diagram of a cable television system adapted for use by an interactive television system.

FIG. 1 is a schematic block diagram of a cable television system adapted for use as an interactive television system in accordance with the invention. A typical cable television system comprises headend equipment 101 at a central location, a distribution network consisting of various feeders 102 and branches 103 and connections to subscriber locations such as 104, where converters and television receivers (or cable-ready television receivers alone) receive the signals from the distribution network. Feeders 102 and branches 103 can be coaxial cable, optical fiber cable, combinations of the two or other equivalent means. In a typical cable television system, various television programs are fed into the different channels of the system by headend equipment 101. Such programs may be received from local broadcasts by broadcast receivers 110, from communications satellites by satellite receivers 111 or directly from local sources 112.

Interactive television (ITV) subscribers are served via dedicated channels of the cable television system from ITV server 120. Server 120 obtains its programming material from such sources as programming center 121 or program library 122. Program library 122 contains stored versions of movies, musical selections, texts, pictorial information and other materials that may be accessed by ITV subscribers. Programming center 121 may be a direct source of program material for server 120 or may prepare such material for library 122.

ITV server 120, programming center 121 and program library 122 may be at the same or different locations and may themselves be connected in networks. There can be multiple servers 120 for different cable systems. Program library 122 may consist of a number of libraries at different locations. However, there will typically be a server 120 dedicated to a particular cable system to interact with the ITV subscribers on that system's distribution network.

There are a wide variety of possible configurations for server 120, all of which will typically include at least one central processor to control programs and other information transmitted to subscribers 104 over the dedicated ITV channels in the cable system and to receive and respond to uplink messages from subscribers 104.

Using well-known compression techniques, a number of full-motion television signals can be transmitted in packetized form over a cable channel in a cable television system. For example, a full-motion NTSC television signal can be compressed and digitized for transmission at 1.5M bits/second. By packetizing such digital information and interleaving such packets, it is possible that as many as 16 such television signals (24M bits/second) can be sent via virtual channels over a standard 6 MHz cable channel. If a lower bandwidth signal (such as an audio signal) is to be sent over a virtual channel, fewer packets need be transmitted for such channel per unit of time.

A typical packet consists of two bytes for a polling address, two bytes identifying the virtual channel of which the packet is a part and 48 data bytes. The data bytes contain the compressed video, audio or other information being transmitted in the virtual channel. At least one virtual channel (for example, channel 00) is reserved for control messages. The data bytes in a typical control message include a field containing the address of the converter for which the message is intended, a field identifying the virtual channel to which the message relates, a field specifying the kind of data to be transmitted on such virtual channel (i.e. still pictures, full motion television, stereo audio, text) and other control information. Control messages are also used to initialize converters as will be described in more detail below.

Figure 2:
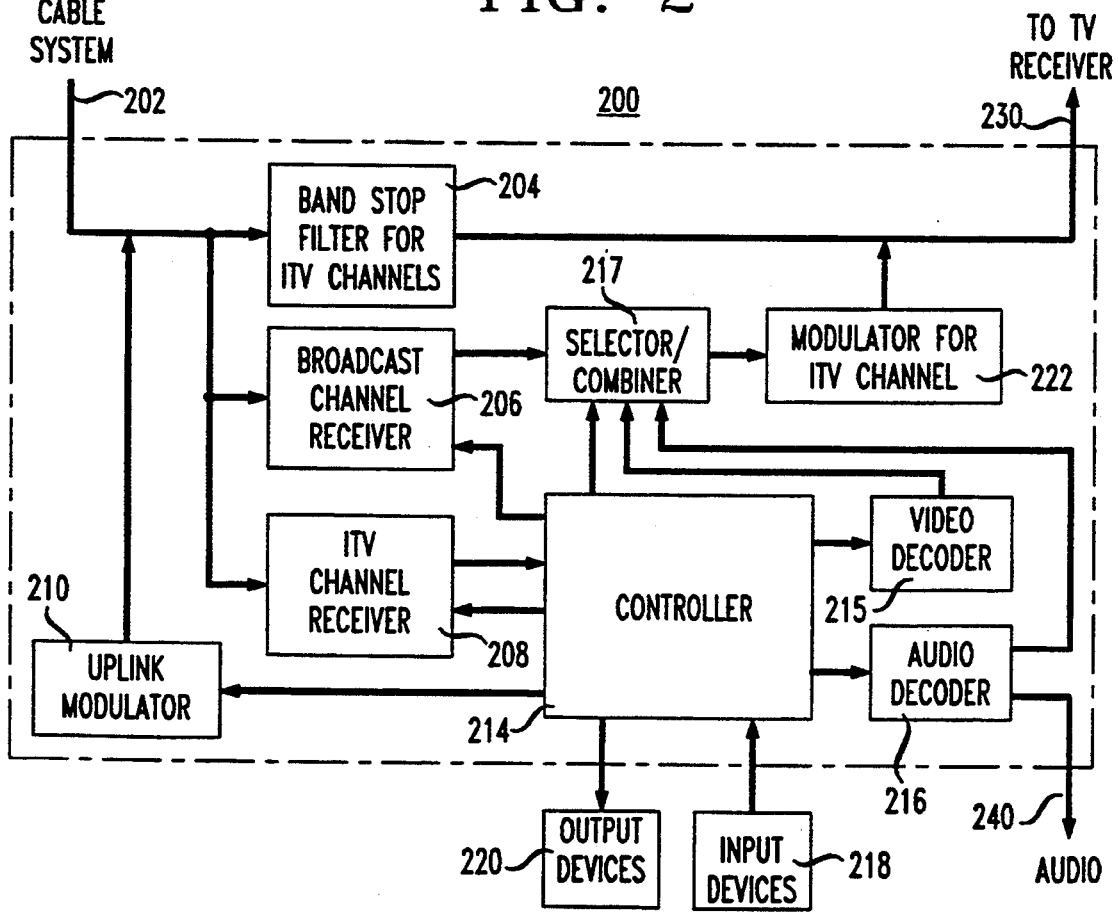
FIG. 2 is a block diagram of a converter in accordance with the invention for use at subscriber locations of an interactive television system.

FIG. 2 is a block diagram of a converter 200 for connection between a cable system and a television receiver at a subscriber's premises. Input cable 202 is typically a coaxial cable or an optical fiber cable connected to the cable distribution system. Cable 202 is connected to inputs of band-stop filter 204, selectable channel receiver 206 and ITV channel receiver 208 and to the output of uplink modulator 210. Cable 202 is part of an input circuit that also contains any amplification and buffering circuits (not shown) needed to connect the cable system to filter 204, receivers 206 and 208 and modulator 210. Such amplification and buffering circuits are well known to those skilled in the art.

ITV channel receiver 208 is tuned to receive the cable channel over which the packetized digital information for the interactive television features is being transmitted. The actual cable channel or channels used for such purpose are assigned by the administrators of the cable system. If more than one such channel is provided, one of the channels is usually considered the "default" channel, which is the channel used to initialize converters such as converter 200. Upon initialization, a converter can be transferred to a different ITV channel by means of a control message. The output of ITV channel receiver 208 is a digital bit stream comprising the packetized digital information, which is forwarded to controller 214.

Controller 214 performs many functions and is typically a microprocessor with both random-access memory (RAM) and read-only memory (ROM). Controller 214 sends control and video information to combiner 217, sends control messages to receivers 206 and 208 specifying the identity of channels to be received, receives manual inputs from manual input devices 218, sends video packets to decoder 215 and audio packets to decoder 216, and transmits information to the cable headend via uplink modulator 210. Controller 214 can also be a source of audio and/or video information. Such information can be retrieved from memory in controller 214 or generated by computer programs in controller 214 under the control of messages from receiver 208 or input devices 218. Examples of such information are symbols or text to be superimposed on video signals or synthesized sounds to be combined with audio signals.

In a typical cable system, uplink messages are sent in the 5–30 MHz band. If desired, uplink messages can also be sent over more than one uplink channel in this range, with the particular channel to be used by a particular converter 200 being specified to uplink modulator 210 by controller 214 in response to a control message from server 120. Uplink channels will typically have a bandwidth in the range from 100,000 KHz to 1MHz.

Decoders 215 and 216 can also be microprocessors, such as digital signal processors, specifically programmed to decode compressed video or audio information, as the case may be, in accordance with the appropriate decoding algorithm, as is well known in the art. Other output devices 220 capable of receiving digital information, such as a printer, can be connected to controller 214 as desired.

The output of selector/combiner 217 is a television signal, the components of which can be either (i) selected from one of a number of sources, such as receiver 206, controller 214, decoder 215 or decoder 216 or (ii) combined from such sources. In its simplest form, selector/combiner 217 forwards to modulator 222 either the television signal received by receiver 206 or the television signal obtained by combining video decoded by decoder 215 with audio decoded by decoder 216. Other versions of selector/combiner 217 can include apparatus controlled by controller 214 to combine various video and audio sources into the television signal to be transmitted to modulator 222. Many techniques are known in the art for combining video sources, such as overlays, windows and split screens.

Selector/combiner 217 operates on digital representations of video signals in which each pixel of a scene is represented by a number of bits and on digital representations of audio signals in which sounds are represented by digitized samples. The outputs of decoder 215, decoder 216 and any audio and video outputs from controller 214 are in digital form; also, the video portion of the television signal from receiver 206 is converted to digital form in converting apparatus (not shown). Such converting apparatus is well known in the art. These digitized video and audio elements are combined in selector/combiner 217 to produce a sequence of digital frames and digital audio samples (possibly for more than one audio channel). These samples are then converted to a conventional television signal, such as an NSTC signal, by apparatus (not shown) also well known in the art.

Band stop filter 204 deletes at least one of the ITV channels, preferably the default channel, from the signal received from cable 202, passing the remaining channels to output cable 230. Modulator 222 modulates the television signal received from selector/combiner 217 into one of the blocked ITV channels on output cable 230. Thus, converter 200 replaces the packetized digital signal received from the cable system in such ITV channel with the video signal from selector/combiner 217. Such ITV channel can then be selected and viewed in the conventional way on a cable-ready television receiver connected to output cable 230. As described above, the television signal modulated into such ITV channel can be produced from ITV packets received over any of the ITV channels.

Figure 3:
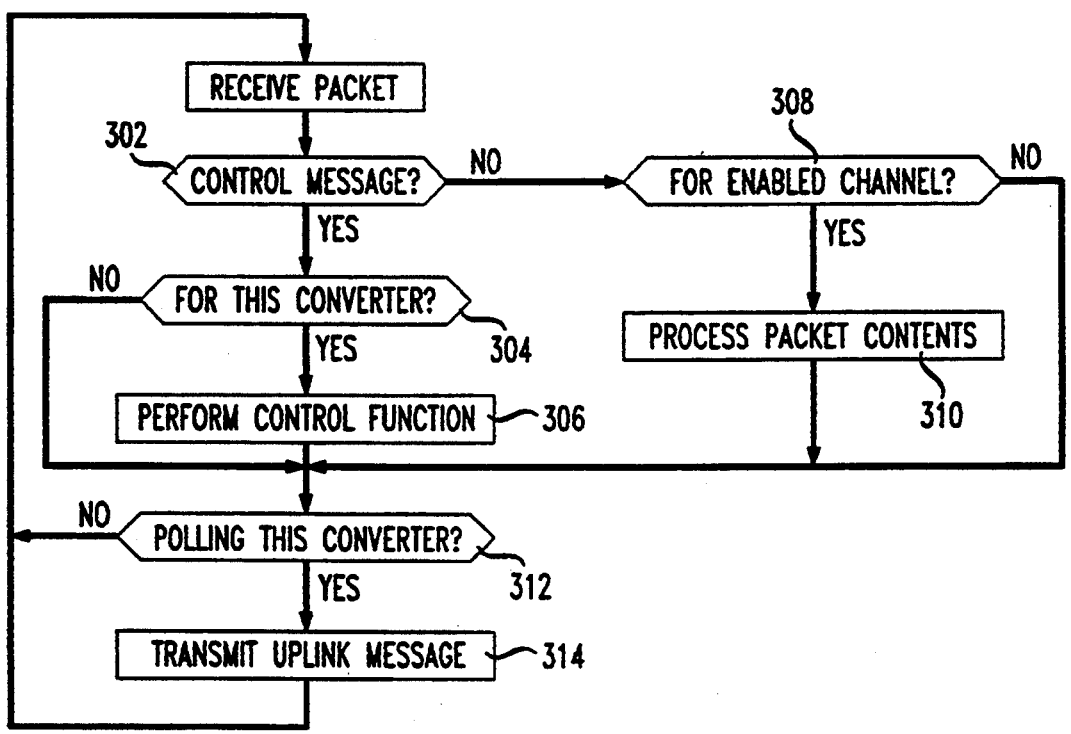
FIG. 3 is a flow chart showing the operation of controller 214 in FIG. 2 upon receipt of a packet of information from the cable system.

FIG. 3 is a flow chart showing the overall operation of controller 214 on receipt of packets from receiver 208. If the "virtual channel" bytes indicate that such packet is a control message, (block 302) and the address field in the control message indicate that the message is intended for converter 200 (block 304), then controller 214 performs the control function specified by the remaining contents of the message (block 306). If the "virtual channel" bytes indicate that such packet is part of a program channel, such as a channel carrying an encoded and digitized video signal, and controller 214 is currently enabled to receive from such channel (block 308), then controller 214 processes the packet contents in accordance with the type of program in such virtual channel (block 310), sending data from the packet to the input buffer in the appropriate output device, such as decoder 215 or decoder 216.

Each packet in which the "polling address" bytes indicate that converter 200 is being polled (block 312) causes such converter to transmit an uplink message to the cable headend (block 314). (The address in the "polling address" bytes is not necessarily the same as in the address field in a control message that may be included in the same packet). This uplink message, typically no more than a few bytes, can contain control information or information entered manually by the subscriber in one of manual input devices 218. Because this message is initiated by a downlink message (from the headend to the subscriber) having an address known at the headend, this address can be associated with the uplink message when received, and there is no need to identify the source of uplink messages.

As mentioned above, controller 214 can contain both RAM and ROM. The ROM includes computer programs that can be permanently loaded, such as programs containing initialization routines; whereas the RAM can be downloaded from the headend by the use of control messages. Such downloading will typically occur when a converter is first connected to the cable system or when programs must be updated. Also, different programs for different purposes can be downloaded in controller 214 at different times. Such downloading capability eliminates the need for program-loading capabilities at converter 200, although such capability could be provided if desired by means of devices such as a disk drive.

Figure 4:
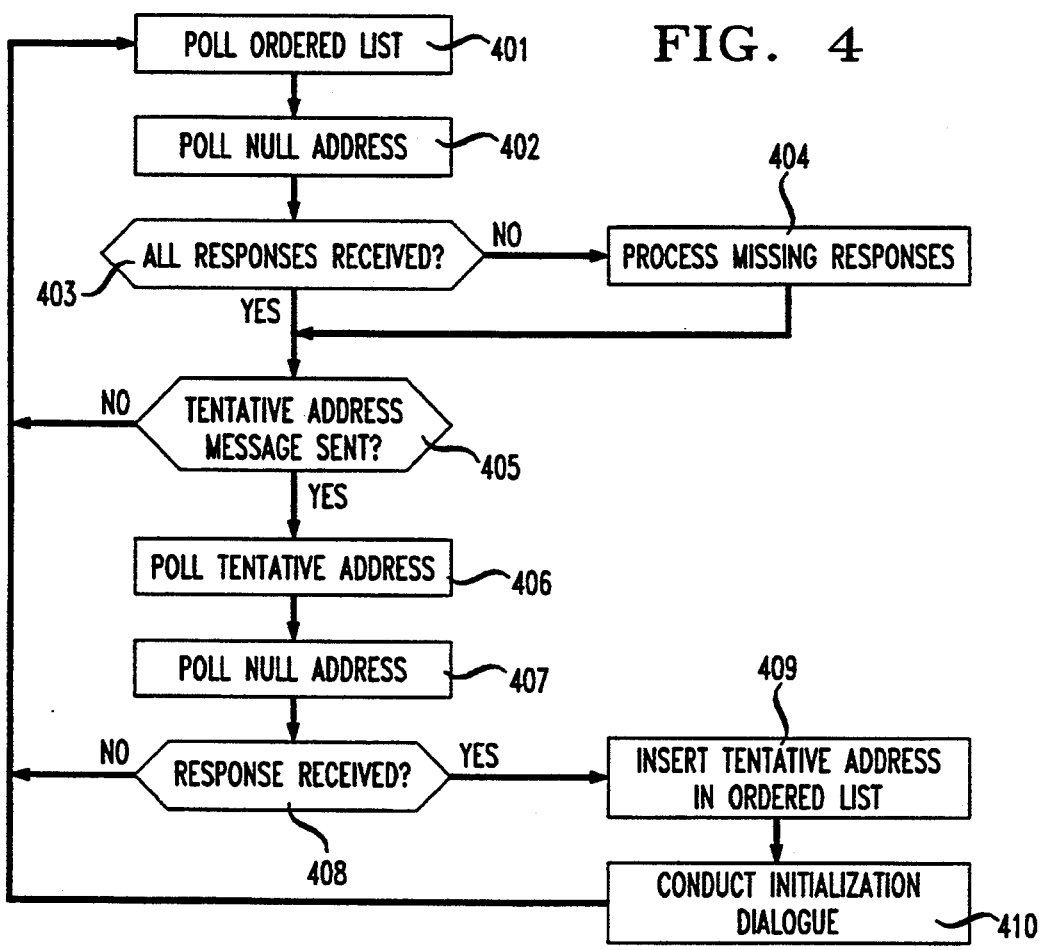
FIG. 4 is a flow chart showing the operation of server 120 in FIG. 1 during initialization of a converter.

FIG. 4 is a flow chart showing the polling sequence followed by server 120 in FIG. 1. As described above, each packet sent by server 120 to converters 200 at subscriber locations 104 contains a polling address, and server 120 receives uplink messages from converters polled. If more than one distribution channel is used as an ITV channel, such polling sequence is used for the "default" ITV channel.

Server 120 transmits polling addresses in successive packets, preferably in accordance with an ordered list, the order being determined by the relative distances of the converters from the cable-system headend (block 401). The first address on the list is that of the closest converter to the headend as measured by transmission time; the last address on the list is that of the farthest converter. This procedure avoids possible interference among uplink messages sent in response to polls. The position of an address in the ordered list is determined during initialization, as will be described below. Server 120 maintains such an ordered list for the default ITV channel and each other ITV channel that may be in service in the system.

After all the addresses in the ordered list have been polled, preferably at least one packet is sent with a null (nonexisting) polling addresses (block 402), thereby inserting enough delay in the polling sequence for the response to the last poll in the ordered list to be received from the farthest converter before the ordered list is polled again (block 402). The converters are programmed to respond to every poll with an uplink message. If such a response is missing (block 403), server 120 determines whether or not to continue polling the unresponsive converter (block 404), as will be explained in more detail below.

Each converter 200 interprets at least the address portion of all control messages to identify messages intended for such converter. However, some special control messages are not addressed to specific converters. For example, periodically (such as once per minute) a special control message is broadcast over the virtual channel used for control signals in the default channel. This special control message is not addressed to a specific converter, but contains a tentative address for use by any newly-connected converter. If such a message has been sent during the last polling sequence (block 405) such tentative address is polled (block 406), again followed by enough polls to a null address to permit a response from the farthest converter (block 407). Because the position of a new converter is not known initially, these null polls insure that a response from a new converter will be received before those from the next iteration of the ordered list.

As will be explained in more detail below in conjunction with the description of FIG. 5, a newly-connected converter operates under an initialization program stored in ROM in the converter. Such initialization program stores the tentative address from such a broadcast control message as its specified address for responding to polls and for receiving control messages and responds to a subsequent poll of such specified address with an uplink message.

If an uplink message is received in response to a poll of the tentative address (block 408), indicating that there is a newly- connected converter, the tentative address is stored in the ordered list (block 409) and a new tentative address is selected for subsequent tentative-address messages. To determine the place of such address in the ordered list, server 120 measures the elapsed transmission time from polling the tentative address in block 406 to receiving the resulting uplink message. Finally, a dialogue is conducted with the newly-connected converter (block 410) consisting of control messages sent by server 120 to the converter using the tentative address stored in the ordered list and uplink messages evoked by polls to such address pursuant to block 401. If no response is received to the poll of the tentative address, indicating that no new converter has been connected, then server 120 returns to block 401 and repeats the entire polling sequence.

During the dialogue indicated by block 410, a newly-connected converter typically will send information to identify itself in uplink messages responding to such tentative-address polls. Such information can be stored in ROM in the converter, such as a unique serial number assigned to the converter, or be entered manually by the person installing the converter. Some examples of such manually entered information are subscribers' personal identification numbers, types of service desired and billing addresses. In case of manually-entered information, control messages sent by server 120 can cause an appropriate request for such information to appear on the screen of a television receiver connected to the converter.

If desired, server 120 can conduct the initialization dialogue over a different virtual channel than the virtual channel in the default ITV channel over which the tentative address is broadcast. Such different virtual channel can also be in the default ITV channel or, if there is more than one ITV channel in use in the system, in a different ITV channel. The server initiates such a channel change by transmitting appropriate control messages to the newly-connected converter 200 to enable such converter to respond to control messages in the new channel. Similarly, if more than one uplink channel is provided, one uplink channel can be used as a "default" uplink channel for responses to polls in the "default" ITV channel, and converter 200 can be caused to transmit over a different uplink channel by an appropriate control message from server 120.

Preferably, a converter always responds with an uplink message to a poll to its specified address, even though it may have no information to send. A dummy uplink message can be used in such cases. For example, in situations where information is being entered manually for transmission by a converter, there may be a number of polls occurring before and during such transmission when there is no information to send. Such dummy uplink messages can be sent in response to polls in such cases.

It is desirable to confirm at least some uplink messages from a newly-connected converter to insure that communications are clearly established and that only a single new converter has been connected. Therefore server 120 echoes at least some uplink messages to the new converter during dialogue 410. It may be preferred to echo only uplink messages containing actual information and not dummy uplink messages. As will be seen, the converter compares the echoed messages with the originals to confirm correct transmission and, if the echoed message is incorrect, restarts its initialization procedure. In the case of such a restart, the converter no longer responds to polls or messages to its current polling address. Since an uplink message from a converter 100 to server 120 typically contains fewer bytes than a control message from server 120 to such converters, it may be preferred to combine a number of echoed uplink messages into one control message.

Failure of a newly-connected converter to respond to a poll after an echoed uplink message probably indicates that the echoed message did not match the original when compared by the converter and that the converter restarted its initialization procedure. Such missing response can be processed (block 404) by simply deleting the address of such converter from the ordered list. Other missing responses may indicate that a converter has been disconnected or that a power failure has occurred. In the case of a converter that has been fully initialized and placed in service, it may be preferable to wait for several non-responses to polls before deleting the address of such a converter.

At the end of the initialization dialogue, computer programs can be downloaded by server 120 to RAM in controller 214 of converter 200. It may be desirable to continue to echo uplink messages to converter 100 so that the communications link between converter 200 and server 120 operates in full-duplex mode.

Figure 5:
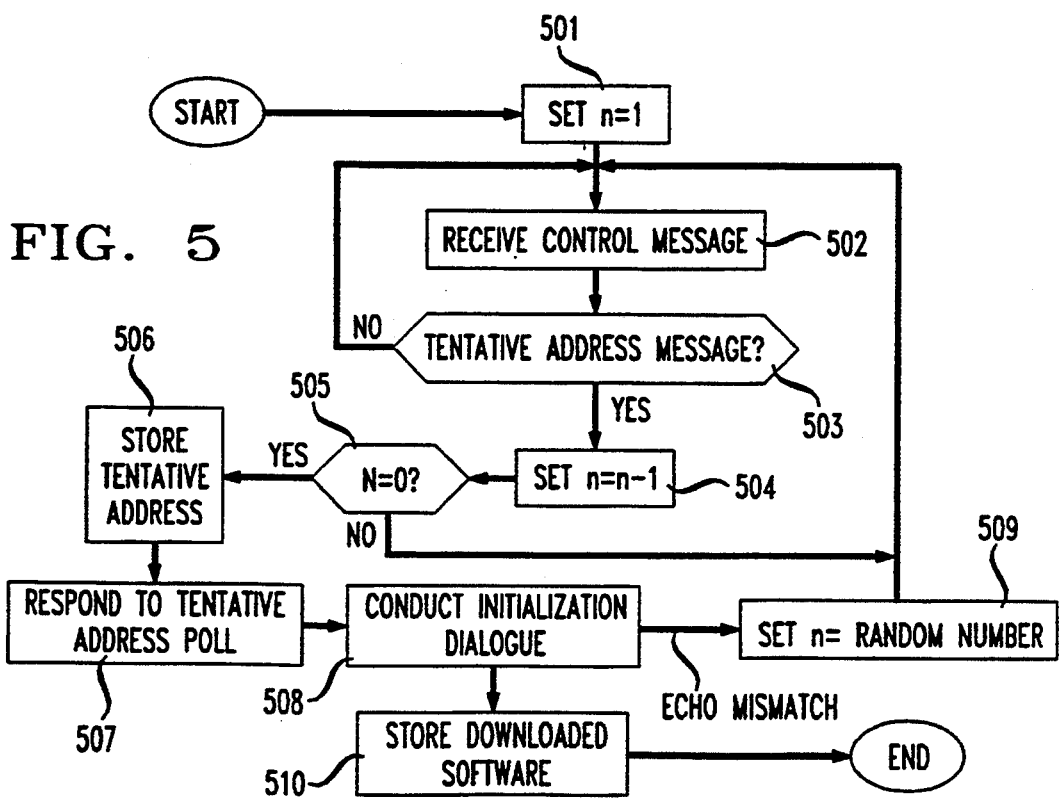
FIG. 5 is a flow chart showing the operation of a converter 200 in FIG. 2 during initialization.

FIG. 5 shows the operation of a converter 200 during initialization. The procedure shown can be stored in ROM in controller 214 and arranged to start when converter 200 is connected to a source of power or when a manual "bootstrap" or "initialize" control is operated. Counter "n" is used in resolving contentions with other newly-connected converters, and is initially set to "1" to permit converter 200 to respond to the first tentative address message received (block 501). As will be seen, "n" is set to a random number if an echoed response is incorrect.

Initially, controller 214 in converter 200 monitors the default ITV channel for control messages (block 502). When a broadcast control message that contains a tentative address is received on the default channel (block 503), counter "n" is decremented (block 504) and, if n=0 (block 505), the tentative address is stored by controller 214 as the specified address of converter 200 for polls and control messages (block 506). When the tentative address is first polled, controller 214 responds by sending an uplink message to server 120 (block 507). Such message can be chosen to specifically identify this particular response as an initial uplink message.

Converter 214 then proceeds with the initialization dialogue with server 120 (block 508), receiving control messages addressed to the stored specified address and sending uplink messages in response to polls to such address. As described above, the uplink message sent when the specified address is polled can contain information stored in ROM in controller 214 or information from manual input, or can be a dummy uplink message if no information is available.

Some of the control messages from server 120 to converter 200 during such dialogue will contain one or more echoed uplink messages. On receiving such a control message, controller 214 compares at least some characters from the echoed uplink messages with the corresponding characters in the uplink messages as sent to detect any mismatches. If a given converter receives a control message containing an echoed uplink message that was not sent by such converter or that does not match an uplink message sent by such converter, which can occur if more than one newly-connected converter responds to polls to the same tentative address, then the given converter ignores further polls and messages to its current specified address and restarts its initialization routine to acquire another address. However, in such a case, counter "n" is first set equal to a random number (block 509) and the default channel is again monitored for tentative address messages (blocks 502 and 503). Assuming that multiple newly-connected converters do not select the same random number, such converters will respond at separate times because of the different countdowns of counter "n." The probability of contention among uplink messages from more than one newly-connected converter is thereby reduced.

An alternate method of dealing with an echo mismatch in accordance with the invention is to count a random number of such mismatches before restarting the initialization routine. In such a method, the procedures indicated in blocks 504 and 505 would be performed in block 508. If the mismatch is caused by more than one newly-connected converter responding to the same polling address, then such converters will restart initialization at random. After the next-to-last such converter reinitializes, leaving a single converter with such polling address, mismatches will disappear and such single converter will not need to reinitialize.

When the initialization dialogue is completed, software can be downloaded, in the form of control messages, from server 120 and stored in RAM in controller 114 (block 510) and converter 200 is then ready for service.

The invention has been shown and described with reference to particular embodiments. However, it will be understood by those skilled in the art that various change may be made therein without departing from the spirit and scope of the invention.

What is claimed is:

1. In a signal distribution system having a system having a server and a plurality of terminals, each said terminal having a specified address for responding to polls and receiving control messages and wherein each said terminal responds to each poll addressed thereto with an uplink message to said server, a method of remotely assigning said specified addresses to newly-connected terminals, which comprises:

in said server:
storing said specified address in a polling list and repeatedly polling said terminals in accordance with said polling list; and
periodically broadcasting a control message containing a tentative address to all said terminals followed by polling said tentative address;

in a newly-connected terminal:
receiving one of said broadcast control messages, storing the tentative address contained in said broadcast control message as the specified address for said terminal and, in response to a poll to said tentative address, sending an initial uplink message to said server;

in said server:
in response to said initial uplink message, inserting said tentative address in said polling list as the specified address for said newly-connected terminal, selecting a new tentative address for use in subsequent broadcast control messages, periodically polling said specified address, receiving additional uplink messages from said newly-connected terminal and echoing at least one of said uplink messages in at least one additional control message addressed to said specified address, in said newly-connected terminal:
comparing at least one character from said echoed uplink messages in said additional control messages with the corresponding at least one character in the uplink messages sent and, if said comparison reveals a difference, repeating said receiving step to acquire a different tentative address for use as the specified address of said terminal.

2. The method of claim 1 which further comprises:
in said newly-connected terminal:
in repeating said broadcast-message receiving step, receiving a random number of said broadcast control messages and, in said storing step, storing the tentative address contained in the last said broadcast control message received as said specified address, thereby reducing the probability of contention with uplink messages from other newly-connected terminals.

3. The method of claim 1 which further comprises:
in said newly-connected terminal:
in said comparing step, before repeating said broadcast-message receiving step, receiving a random number of said echoed uplink messages in which said comparison reveals a difference.

4. The method of claim 1 which further comprises:
in said server:
ordering said specified addresses in said polling list in accordance with the distances of the terminals associated with said specified addresses from said server and, in said terminal polling step,
beginning said polling step by polling the closest terminal and following said polling step with at least one additional poll to a null address, thereby reducing the probability of interference among uplink messages from different terminals.

5. The method of claim 1 which further comprises:
in said server:
following said poll of said tentative address with at least one poll of a null address.

6. The method of claim 4 wherein said distance from said server to each newly-connected terminal is determined by:
measuring the response time from polling said tentative address to receipt of said initial uplink message from said newly-connected terminal.

7. The method of claim 1 which further comprises:
in said server:
if an uplink message is not received in response to polling a given newly-connected terminal, removing the specified address of said terminal from said polling list.

8. The method of claim 1 in which said signal distribution system is an interactive cable television system, said terminals are converters at subscriber locations for connecting said cable television system to television receivers and said control messages and polls are contained in digital packets in at least one channel of said cable television system.

9. In a signal distribution system having a server and a plurality of terminals, each said terminal having a specified address for responding to polls and receiving control messages from said server and wherein each said terminal responds to each poll addressed thereto with an uplink message to said server, a method of remotely assigning said specified addresses to newly-connected terminals, which comprises:
repeatedly polling said specified addresses,
periodically sending a tentative address from said server to all said terminals and polling said tentative address,
in a newly-connected terminal, receiving and storing said tentative address as the specified address for said terminal and sending an initial uplink message in response to said tentative- address poll,
in said server, on receipt of said uplink message, including said tentative address as a specified address, choosing a new tentative address and echoing at least one uplink message to said newly- connected terminal, in said newly-connected terminal, comparing at least one echoed uplink message with the uplink message as sent, and if such messages are different, repeating said receiving and storing step to acquire a different specified address.

* * * * *